United States Patent
Webb et al.

(10) Patent No.: US 8,430,432 B2
(45) Date of Patent: Apr. 30, 2013

(54) PIPE COUPLING

(75) Inventors: Ian Richard Webb, Buckinghamshire (GB); Neil John Thornton Taylor, Hertfordshire (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 205 days.

(21) Appl. No.: 12/449,889

(22) PCT Filed: Feb. 29, 2008

(86) PCT No.: PCT/GB2008/000701
§ 371 (c)(1),
(2), (4) Date: Oct. 15, 2010

(87) PCT Pub. No.: WO2008/104792
PCT Pub. Date: Sep. 4, 2008

(65) Prior Publication Data
US 2011/0025053 A1 Feb. 3, 2011

(30) Foreign Application Priority Data
Mar. 1, 2007 (GB) ................................. 0703994.4

(51) Int. Cl.
*F16L 21/02* (2006.01)

(52) U.S. Cl.
USPC ............................ 285/340; 285/373; 285/420

(58) Field of Classification Search .................. 285/340, 285/369, 372, 373, 420
See application file for complete search history.

(56) References Cited

U.S. PATENT DOCUMENTS

| | | | |
|---|---|---|---|
| 5,333,916 A | 8/1994 | Burkit et al. | |
| 5,351,997 A * | 10/1994 | Webb et al. | 285/105 |
| 6,749,232 B2 * | 6/2004 | Wachter et al. | 285/104 |
| 2005/0104369 A1* | 5/2005 | Webb et al. | 285/104 |

FOREIGN PATENT DOCUMENTS

| | | |
|---|---|---|
| DE | 42 04 762 C1 | 7/1993 |
| EP | 0 542 779 B1 | 4/1996 |
| EP | 1 526 314 A1 | 4/2005 |
| GB | 2264543 A * | 9/1993 |
| WO | WO 92/02752 | 2/1992 |
| WO | WO 03/071178 A1 | 8/2003 |

OTHER PUBLICATIONS

International Preliminary Report on Patentability and Written Opinion of the International Searching Authority, issued in PCT/GB2008/000701 Sep. 1, 2009 (8 sheets).
International Search Report and Written Opinion dated Jun. 11, 2008.

* cited by examiner

*Primary Examiner* — Daniel P. Stodola
*Assistant Examiner* — Jay R Ripley
(74) *Attorney, Agent, or Firm* — Flynn, Thiel, Boutell & Tanis, P.C.

(57) ABSTRACT

A pipe coupling with an anchoring arrangement for locking the pipes together axially. The anchoring arrangement comprises a tubular casing, a frusto-conical gripping ring with inwardly projecting gripping teeth and tensioning bolts for tightening the casing about the frusto-conical gripping ring. The frusto-conical gripping ring is formed of a plurality of arcuate segments which overlap to form a complete ring. By forming the gripping ring of segments, the gripping ring is able to adapt to pipes that are not truly circular in cross section and a better grip on the pipe may be achieved than with a single-piece gripping ring.

14 Claims, 5 Drawing Sheets as of more than 360° at its centre of curvature and the
ends of the strip overlap to form a complete ring.

PIPE COUPLING

FIELD OF THE INVENTION

The present invention relates to pipe couplings and is concerned with an arrangement for anchoring pipes to lock them axially together. It is particularly concerned with pipe couplings for connecting together two plain-ended pipes.

BACKGROUND OF THE INVENTION

In our patent specification EP-A-0542779 we describe a pipe coupling for connecting together two plain-ended pipes in a fluid-tight manner, of the type consisting of a tubular casing formed with a longitudinal gap, a sealing gasket of resilient flexible material typically of rubber or synthetic rubber, arranged within the casing, and tensioning means for reducing the width of the longitudinal gap so as to tighten the casing around the gasket. In use, the sealing gasket is placed around the adjacent pipe ends and the tensioning means are tightened to clamp the gasket against the outer surfaces of the pipe ends to form a fluid-tight seal.

Fluid pressure in a pipeline tends to force the pipe ends apart. The coupling of the above-mentioned patent specification has an arrangement for securing the pipe against axial movement relative to the coupling under such loads. The sealing gasket has circumferential slots in its outer surface at each end of the gasket. A frusto-conical gripping ring with inwardly projecting gripping teeth is located in each slot. In use, when the tensioning means are tightened around the casing the gripping teeth penetrate the sealing gasket at the bottom of the slot and engage the outer surface of the pipe to hold the pipe ends against axial displacement.

The known anchoring arrangement is satisfactory for many applications. We have found however that there are circumstances where an anchoring arrangement is required that will provide a better grip, for example, for pipes made of hard material, such as some grades of stainless steel, for example 316Ti, pipes that are not truly circular in cross section due to variations in manufacturing tolerances, and pipes that have to carry fluid at very high pressure. In some marine applications, for example, pipes are required to operate at 16 bar pressure. Safety regulations require couplings to perform at four times the operating pressure, that is 64 bar. The axial load on a coupling at 64 bar may be sufficient to cause the teeth to slip on the surface of the pipe in some situations.

With the known coupling, under normal operation, as the axial load on the pipe increases, the frusto-conical gripping ring tends to flatten, causing the teeth to bite deeper into the pipe surface, improving the grip. However, when the pipe is of a particularly hard material or misshapen, under large axial loads such as would be produced at 64 bar, slippage may occur due to a tendency for the teeth to 'jump' on the surface of the pipe. We have found that this 'jumping' occurs because the gripping ring does not engage the surface of the pipe uniformly around its circumference. This variation in grip arises due to the inability of the gripping ring to conform to variations in the shape of the pipe and variations in the load applied at different points around the circumference by the casing due to the presence of the longitudinal gap and the increased stiffness in the region where the tensioning means are attached to the casing which may result in the casing tending to flatten in some areas.

The gripping ring of the known coupling is formed of a single strip of steel pressed into conical form and wound into a helix so that when in place in the coupling the strip subtends an angle of more than 360° at its centre of curvature and the ends of the strip overlap to form a complete ring.

SUMMARY OF THE INVENTION

We have found that by forming the frusto-conical gripping ring of a plurality of arcuate segments which overlap to form a complete ring, the gripping ring achieves a better grip on the pipe surface and a coupling can be produced that performs better under high axial loads than the known coupling.

According to the present invention an anchoring arrangement for a pipe coupling for connecting together two pipes, the anchoring arrangement comprises a casing, a frusto-conical gripping ring with inwardly projecting gripping teeth located in the casing, and tensioning means for tightening the casing about the frusto-conical gripping ring, the frusto-conical gripping ring being formed of a plurality of arcuate segments which overlap to form a complete ring.

In one embodiment of the invention, the gripping ring is formed in two segments. The segments comprise a major segment which subtends an arc of greater than 180° at the axis of the gripping ring and a minor segment which subtends an arc of less than 180° at the axis of the gripping ring. The casing is formed with a longitudinal gap and the tensioning means is arranged to reduce the longitudinal gap when tightened, the minor segment is located adjacent the longitudinal gap and the major segment is located to the side of the casing remote from the longitudinal gap, the major and minor segments overlapping one another on either side of the gap.

BRIEF DESCRIPTION OF THE DRAWINGS

An embodiment of the invention will now be described, by way of example, with reference to the accompanying drawings, of which:—

DETAILED DESCRIPTION

Figure 1:
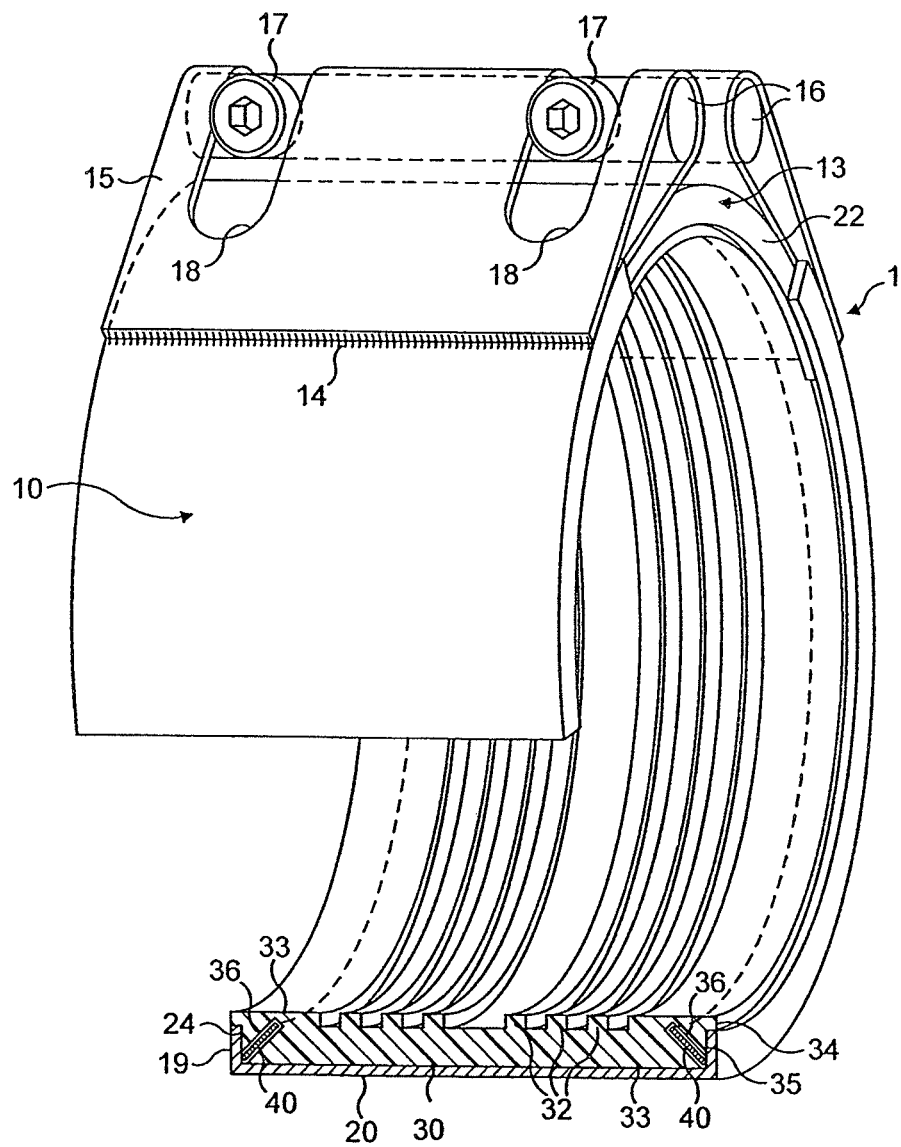
FIG. 1 shows a perspective cut-away view of a coupling in accordance with the invention.
Figure 2:
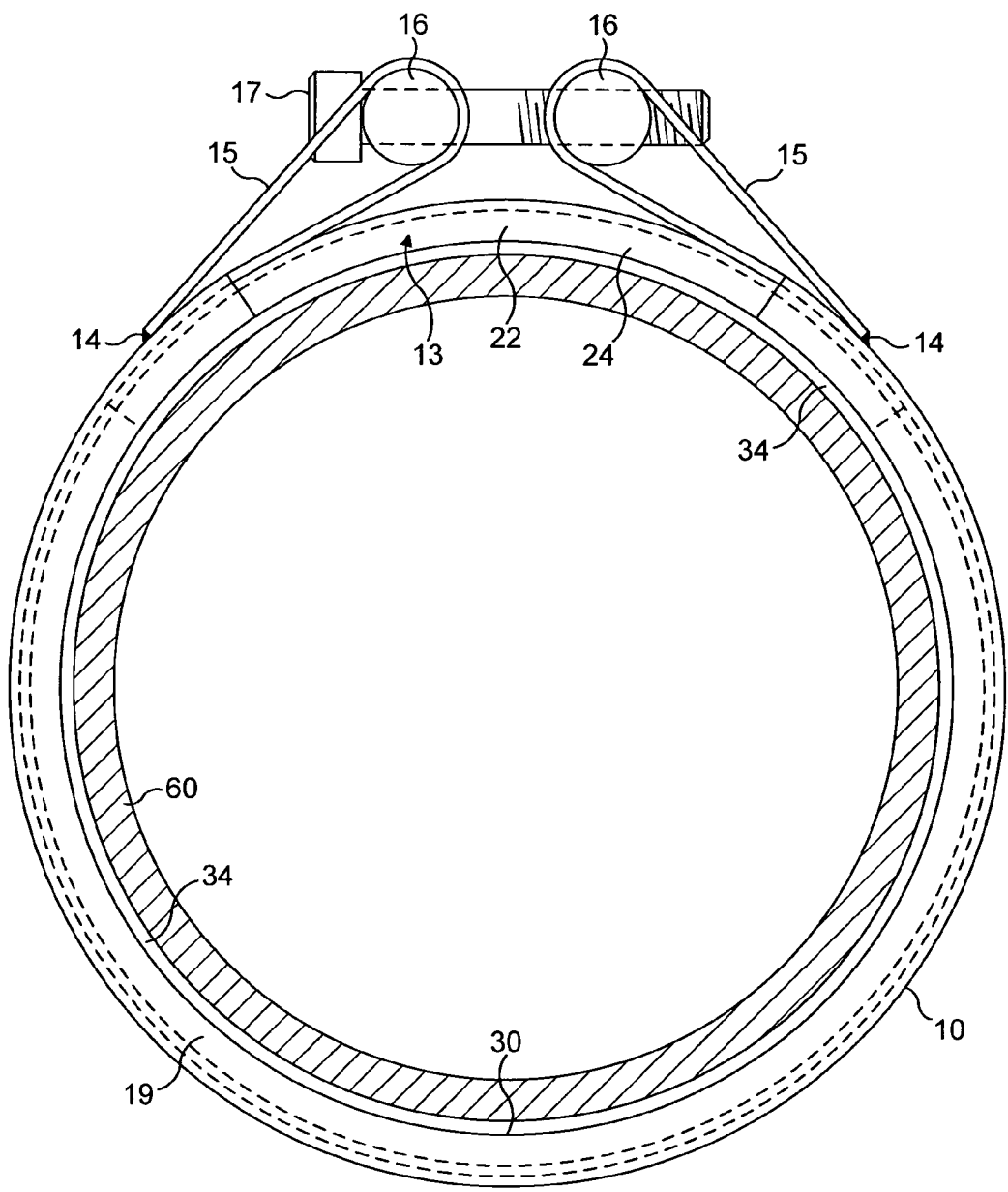
FIG. 2 shows an end view of the coupling of FIG. 1.

A pipe coupling 1 comprises tubular casing 10, a sealing gasket 30 and two anchoring arrangements 40. The casing 10 is formed of a rolled steel strip, formed into a tube with a longitudinal gap 13 between the free ends of the strip. The free ends of the strip that forms the casing are folded back on themselves and welded at 14 to form loops 15 along opposite edges of the longitudinal gap 13. Pins 16 are inserted in the loops. Tensioning bolts 17 pass through transverse holes in one of the pins 16 into tapped transverse holes in the other of the pins 16, so as to interconnect the two free ends of the outer casing. Slots 18 are cut in the loops 15 so as to provide clearance for the bolts. The axial end margins of the casing 10 are bent inwardly at right angles to the tubular web portion 20 of the casing to form flanges 19 projecting inwardly towards the centre axis of the casing.

A bridging member 22 of rolled steel is located inside the casing 10 and spans the longitudinal gap 13. The bridging member is curved about the centre axis of the casing. The end margins of the bridging member 22 are bent inwardly at right angles to the part-cylindrical web portion 23 of the bridging member to form flanges 24 projecting inwardly towards the centre axis of the casing. The casing 10 on either side of the longitudinal gap overlaps the bridging member. The axial length of the bridging member 22 is slightly less than that of the casing 10 so that, where they overlap, the flanges 24 fit inside the flanges 19.

The sealing gasket 30 is of an elastomeric material, for example, rubber. The inner surface of the gasket is formed with two sets of annular sealing ribs 32 which project inwardly towards the centre axis of the seal. Near its ends the inner side of the sealing gasket is formed with raised sealing surfaces 33. The extreme ends of the gasket are formed by axial extensions, which form end seals 34.

The gasket 30 fits inside the casing formed by the casing 10 and the bridging member 22 with the side flanges 19 and 24 fitting into a recess 35 formed behind the end seals 34.

A frusto-conical slot 36 is formed in the outer surface of the gasket at each end of the gasket. The outer end of each slot lies at the axial end of the outer surface, the inner end of the slot lies close to the inner surface of the raised sealing surface 33. The slope of the slot is such that the inner end of the slot is nearer the axial middle of the gasket than the outer end.

An anchoring arrangement in the form of a frusto-conical ring 40 is located in each of the slots 36. Each ring 40 is formed of two arcuate segments 40a and 40b. The segment 40a is a minor segment and subtends at its centre of curvature an angle of less than 180°, say between 170° and 90°, typically approximately 140°. The segment 40b is a major segment and subtends at its centre of curvature an angle of more than 180°, say between 200° and 270°, typically approximately 250°. The segments 40a and 40b are placed together in the slot 36 so that they overlap in the regions 45 and form a complete frusto-conical ring.

The ring segments 40a and 40b are made of metal, preferably hard steel. The inner edges of the ring segments are cut at intervals to form teeth 42. When the coupling is assembled the teeth sit in the bottom of their respective slot 36 and the outer edges 43 of the ring segments sit in the angle 44 formed by the flanges 19 and 24 and inner surfaces of the tubular web portions 20 and 23 of the casing and the bridging member.

Figure 3:
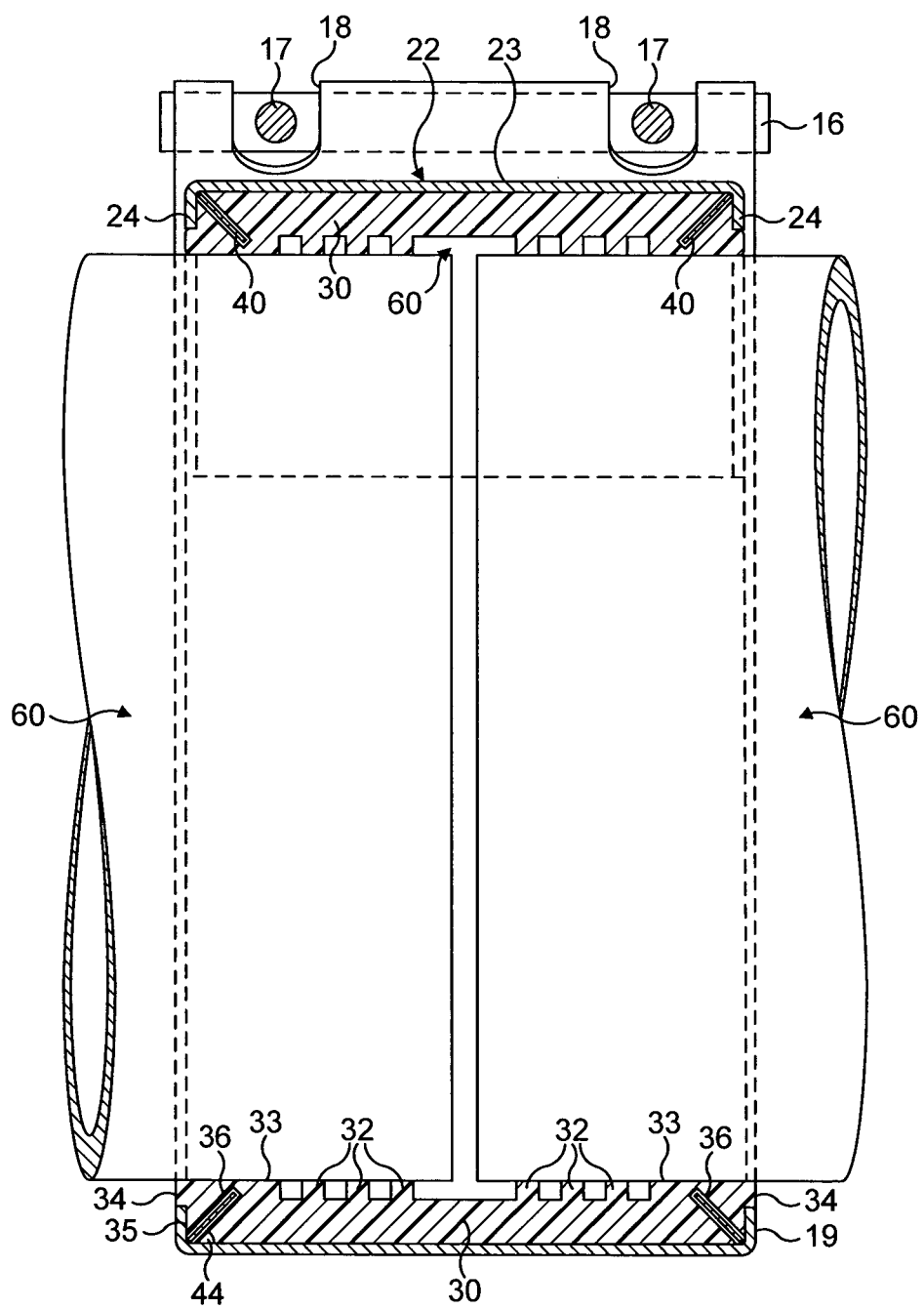
FIG. 3 shows a longitudinal section through the coupling of FIG. 1.
Figure 4:
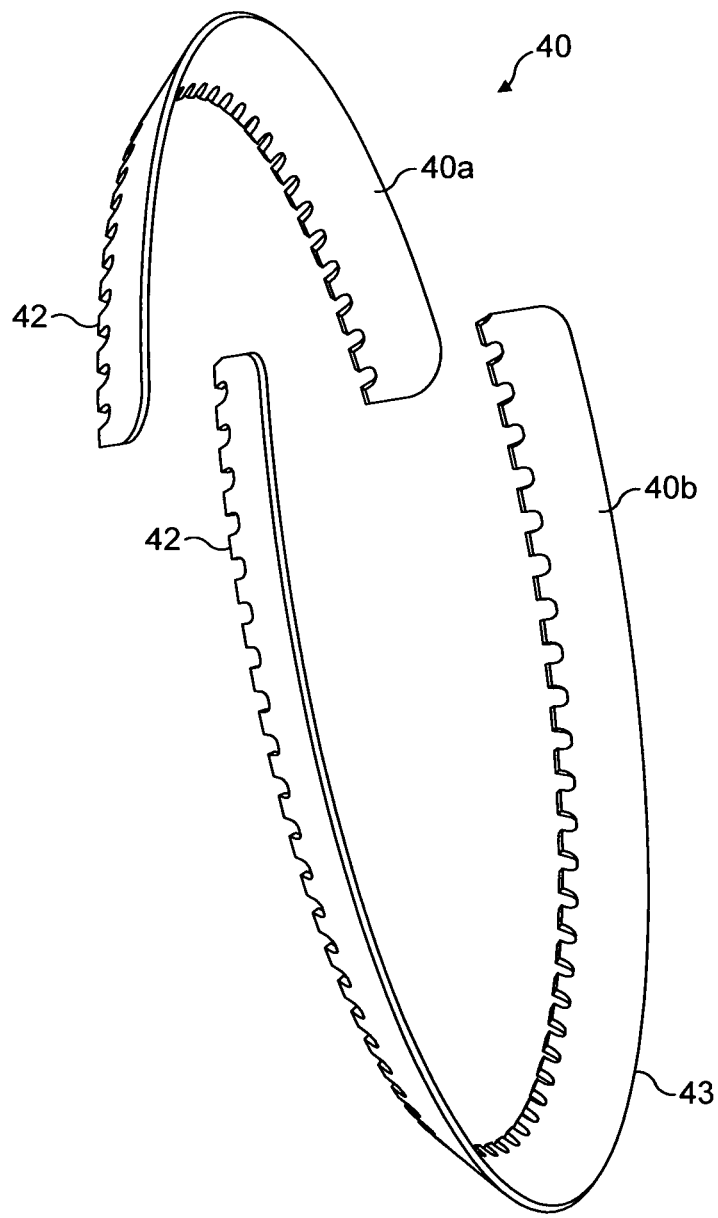
FIG. 4 shows an exploded perspective view of the gripping ring of the coupling of FIGS. 1 to 3.
Figure 5:
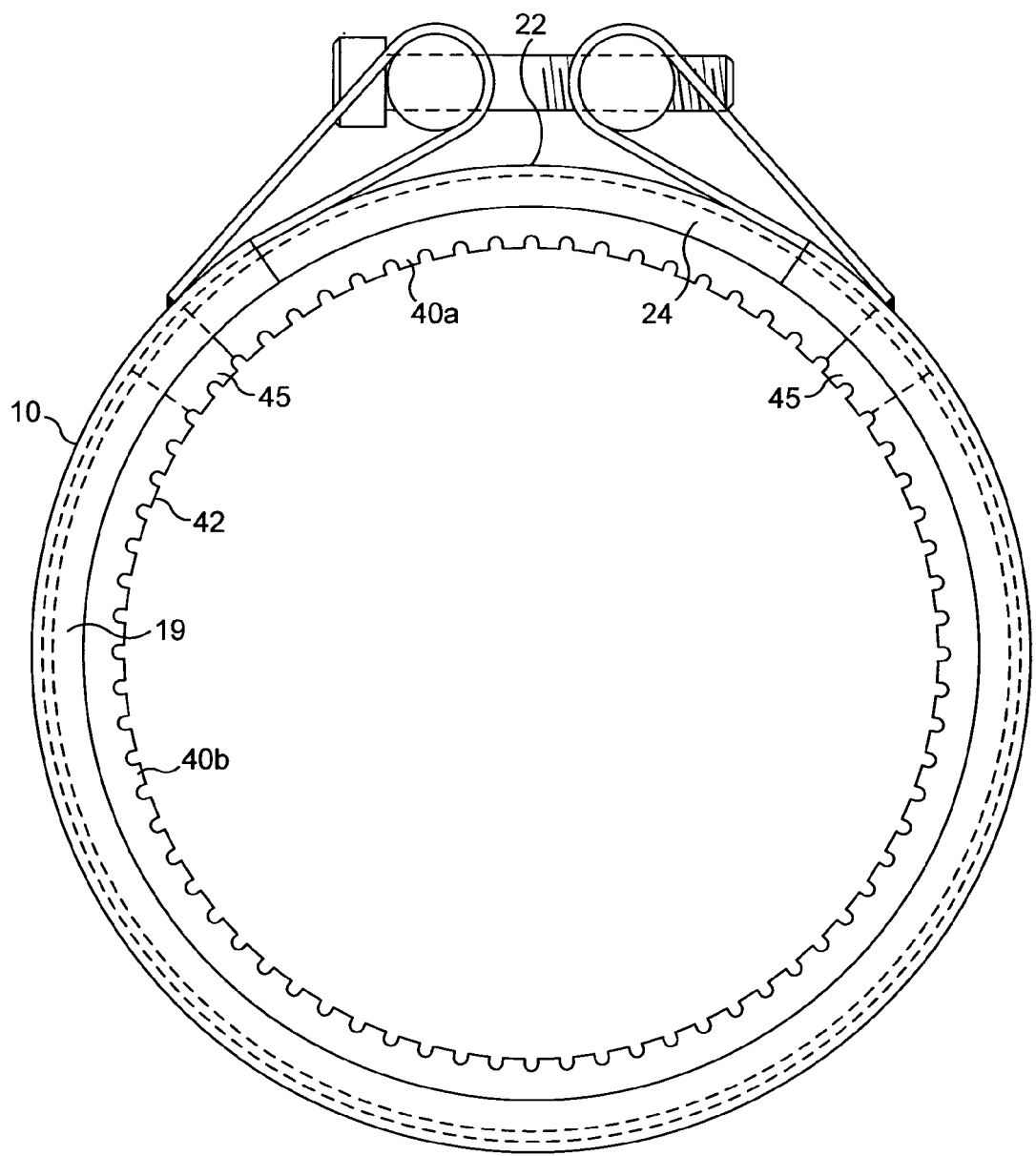
FIG. 5 shows an end view of the coupling of FIG. 1 with the sealing gasket removed to reveal the gripping ring of FIG. 4.

In use, the ends of two plain ended pipes 60 are inserted into the coupling from opposite ends as shown in FIG. 3. A space of, say, 10 mm may be left between the pipe ends to allow for angular deflection, or to avoid abrasive wear, or to dampen vibration. With the coupling in place, the bolts 17 are tightened to clamp the coupling to the pipes. As the bolts 17 are tightened, the edges of the casing 10 on either side of the longitudinal gap 13 are drawn together, thereby causing the casing to apply a radially compressive force to the sealing gasket and the frusto-conical ring. The bridging member is arranged so that it spans the longitudinal gap 13. In this way the bridging member supports the gasket in the region of the gap 13 where there is no support from the casing.

The tightening of the tensioning bolts 17 presses the annular sealing ribs 32 and the sealing surfaces 33 into sealing contact with the outer surfaces of the pipe ends. At the same time, the gripping ring 40 is pushed inwardly towards the centre axis of the coupling by the casing 10 and the bridging member 22, the outer edge of the ring being gripped by the casing in the angle between the cylindrical web portion 20 and 25 of the casing and the flanges 19 and 24. The compression of the gripping ring causes the edges of its teeth 42 to penetrate through the gasket 30 at the bottom of the slot 36 and bite into the surface of the pipe, thereby anchoring of the coupling to the pipe against axial movement. The overlapping parts of the ring segments 40a and 40b can slide over one another in the slot allowing the ring to shrink in diameter as it is compressed by the tightening of the casing.

The extensions 34 are trapped between the flanges 19 and 24 on the casing 10 and the bridging member 22, on the one hand, and the outer surfaces of the pipe ends on the other, to form end seals to prevent liquid and dirt from entering the coupling from outside.

The slot 36 in which the toothed ring segments are placed is sufficiently wide with regard to the thicknesses of the ring segments that they can slide over one another when the coupling is tightened and find their own settlement. A lubricant may be applied to the ring segments to enable their overlapping portions to slide over one another more easily. The outer-edges are located in the angle between the flanges and web portions of the casing and the bridging member. The positions of the inner edges are determined by the position where they bites into the surface of the pipe. As the coupling is tightened the teeth bite deeper into the pipe. The angle of approximately 45 degrees which is established between the ring and the pipe surface when the ring first bites is maintained as the coupling is tightened.

We have found that a coupling with the anchoring arrangement as described above can perform satisfactorily under test pressures of 64 bar with pipes of 316Ti stainless steel.

Modifications of the arrangement described above are possible within the scope of the invention. For example, the gripping ring may be made of more than two segments. Where the gripping ring is formed of more than two segments, each segment overlaps the segments on either side of it circumferentially so that the overlapping segments form a complete ring around the axis of the pipe coupling.

The invention claimed is:

1. An anchoring arrangement for a pipe coupling for connecting together two pipes, said anchoring arrangement comprising:
    a tubular casing;
    a frusto-conical gripping ring located in said casing; and
    tensioning means for tightening said casing about said frusto-conical gripping ring,
    said frusto-conical gripping ring comprising an outer edge, an inner edge and inwardly projecting gripping teeth on said inner edge, said frusto-conical gripping ring being formed of a plurality of arcuate segments that overlap to form a complete ring, wherein the plurality of arcuate segments are configured to be able to slide over each other;
    wherein said gripping ring comprises two segments;
    wherein said two segments comprise a major segment that subtends an arc of greater than 180° at said center axis, and a minor segment that subtends an arc of less than 180° at said center axis; and
    wherein said tubular casing is formed with a longitudinal gap and wherein said tensioning means is arranged to reduce the longitudinal gap when tightened, said minor segment being located adjacent said longitudinal gap and said major segment being located remote from said longitudinal gap, said major and minor segments overlapping one another on either side of said gap.

2. An anchoring arrangement as claimed in claim 1 wherein said casing comprises a cylindrical web portion with a center axis and a flange projecting inwardly from said web portion towards the center axis, an angle formed between said flange and said web portion, said outer edge of the gripping ring being located in the angle between said flange and said web portion.

3. An anchoring arrangement as claimed in claim 1 further comprising means for retaining said segments of the gripping ring in position in said tubular casing.

4. An anchoring arrangement as claimed in claim 3 wherein said retaining means comprise an annular member of elastomeric material, said annular member having a circumferential slot, said segments of said gripping ring being located in said circumferential slot.

5. An anchoring arrangement as claimed in claim 4 wherein said retaining means has a radially outer surface, and a radially inner surface, said circumferential slot extending inwardly from said outer surface toward said radially inner surface, said slot being open at said radially outer surface, said slot having a radially inner end that is closed proximate said radially inner surface, said segments being located in said slot with said gripping teeth adjacent said closed inner end, whereby the gripping teeth penetrate the retaining means and said radially inner surface to engage the outer surface of the pipe when said tensioning means are tightened.

6. An anchoring arrangement for a pipe coupling for connecting together two pipes, said anchoring arrangement comprising:
a tubular casing with a central axis;
a frusto-conical gripping ring located in said casing; and
tensioning means for tightening said casing about said frusto-conical gripping ring,
said frusto-conical gripping ring comprising an outer edge, an inner edge and inwardly projecting gripping teeth on said inner edge,
said frusto-conical gripping ring being formed of two arcuate segments, the two segments comprising a minor segment and a major segment, the minor segment subtending an angle of less than 180° about the central axis and the major segment subtending an angle of more than 180° about the central axis, the ends of the segments overlapping one another so that the segments completely encircle the central axis to form a complete ring, wherein the two arcuate segments are configured to be able to slide over each other;
wherein said tubular casing is formed with a longitudinal gap and wherein said tensioning means is arranged to reduce the longitudinal gap when tightened, said minor segment being located adjacent said longitudinal gap and said major segment being located remote from said longitudinal gap, said major and minor segments overlapping one another on either side of said gap.

7. An anchoring arrangement as claimed in claim 6 wherein said casing comprises an inwardly projecting flange having an inner edge, the gripping teeth on the gripping ring lying closer to the central axis than the inner edge of the flange.

8. An anchoring arrangement for a pipe coupling for connecting together two pipes, said anchoring arrangement comprising:
a tubular casing having axial ends;
two frusto-conical gripping rings;
tensioning means for tightening said casing about said frusto-conical gripping rings;
said casing comprises a cylindrical web portion with a central longitudinal axis and a flange at each of the axial ends of the casing projecting inwardly from said web portion towards the central longitudinal axis, an angle being formed between each of said flanges and said web portion,
each gripping ring comprising an outer edge, an inner edge and inwardly projecting gripping teeth on said inner edge,
the outer edge of each gripping ring being located in a respective one of said angles between said flanges and said web portion,
each said frusto-conical gripping ring being formed of a plurality of arcuate segments that overlap to form a complete ring, wherein the plurality of arcuate segments are configured to be able to slide over each other;
wherein each gripping ring comprises two segments;
wherein said two segments comprise a major segment that subtends an arc of greater than 180° at said center axis, and a minor segment that subtends an arc of less than 180° at said center axis; and
wherein said tubular casing is formed with a longitudinal gap and wherein said tensioning means is arranged to reduce the longitudinal gap when tightened, said minor segment being located adjacent said longitudinal gap and said major segment being located remote from said longitudinal gap, said major and minor segments overlapping one another on either side of said gap.

9. A pipe coupling for connecting together two pipes in a fluid-tight manner comprising:
a tubular casing having axial ends;
a tubular sealing gasket located inside the casing;
two frusto-conical gripping rings;
tensioning means for tightening said casing about said sealing gasket and said frusto-conical gripping rings;
said casing comprises a cylindrical web portion with a central longitudinal axis and an inwardly projecting flange at each of the axial ends of the casing projecting inwardly from said web portion towards the central longitudinal axis, an angle being formed between each of said flanges and said web portion,
each gripping ring comprising an outer edge, an inner edge and inwardly projecting gripping teeth on said inner edge,
the outer edge of each gripping ring being located in a respective one of said angles between said flanges and said web portion,
each said frusto-conical gripping ring being formed of a plurality of arcuate segments that overlap to form a complete ring, wherein the plurality of arcuate segments are configured to be able to slide over each other;
wherein each gripping ring comprises two segments;
wherein said two segments comprise a major segment that subtends an arc of greater than 180° at said center axis, and a minor segment that subtends an arc of less than 180° at said center axis; and
wherein said tubular casing is formed with a longitudinal gap and wherein said tensioning means is arranged to reduce the longitudinal gap when tightened, said minor segment being located adjacent said longitudinal gap and said major segment being located remote from said longitudinal gap, said major and minor segments overlapping one another on either side of said gap.

10. A pipe coupling as claimed in claim 9 including two slots in said sealing gasket, said slots being located at each axial end of the said casing, said slots extending circumferentially around the gasket, a respective one of said gripping rings being located in each of said slots.

11. A pipe coupling as claimed in claim 10 wherein said sealing gasket has an outer surface and an inner surface, said slots being open at said outer surface and extending inwardly towards said inner surface, said slots being closed at their inner ends, said gripping teeth on said gripping rings being located adjacent the closed inner ends of said slots, the arrangement being such that, in use, tightening said tensioning means causes said sealing gasket to be pressed into sealing engagement with the pipe ends and said gripping teeth to penetrate the gasket at the closed end of the slot and project through the inner surface of the gasket to engage the pipe.

12. A pipe coupling as claimed in claim 11 wherein said slots are frusto-conical, the closed inner ends of the slots being closer to one another than the open outer ends.

13. A pipe coupling as claimed in claim 9 wherein said casing comprises an outer casing and a bridging member, the bridging member being located to the inside of the outer casing and spanning the longitudinal gap whereby said sealing gasket is supported around its entire periphery either by the outer casing or by the bridging member or by both.

14. A pipe coupling as claimed in claim 9 wherein each inwardly projecting flange has an inner edge, the gripping teeth on the gripping rings lying closer to the central axis than the inner edges of the flanges.

* * * * *